March 10, 1959  R. G. BUSH  2,877,120
METHOD OF INTERLEAVING SHEETS OF MATERIAL
BETWEEN SLICES OF FOOD AND
APPARATUS THEREFOR
Filed Dec. 24, 1956  4 Sheets-Sheet 1

INVENTOR:
ROBERT G. BUSH
BY
Marzall, Johnston, Cook & Root
ATT'YS

March 10, 1959

R. G. BUSH 2,877,120

METHOD OF INTERLEAVING SHEETS OF MATERIAL
BETWEEN SLICES OF FOOD AND
APPARATUS THEREFOR

Filed Dec. 24, 1956

*INVENTOR:*
ROBERT G. BUSH
BY
Marzall, Johnston, Cook & Root
ATT'YS

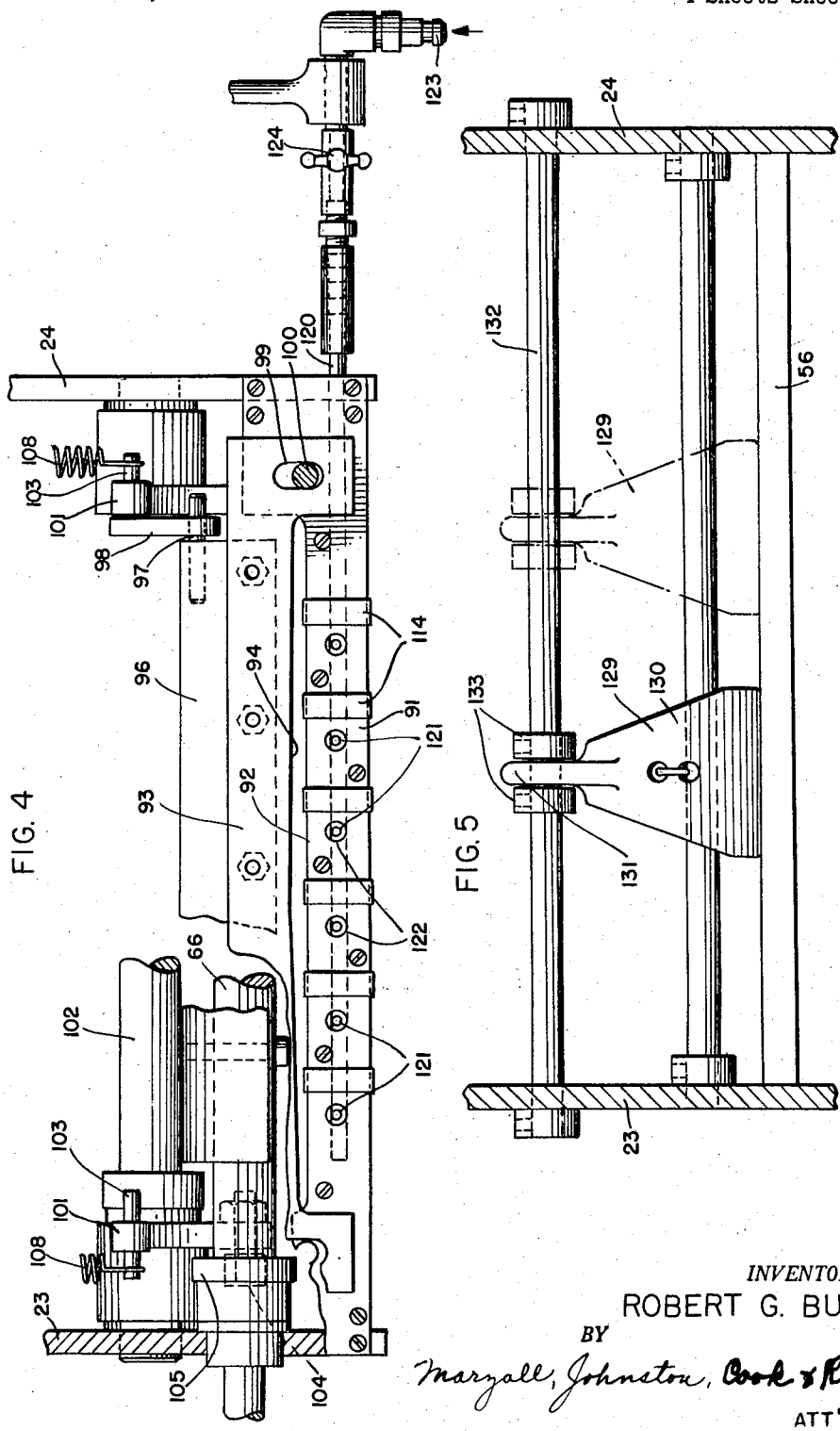

March 10, 1959

R. G. BUSH 2,877,120

METHOD OF INTERLEAVING SHEETS OF MATERIAL
BETWEEN SLICES OF FOOD AND
APPARATUS THEREFOR

Filed Dec. 24, 1956

INVENTOR:
ROBERT G. BUSH
BY
Maryall, Johnston, Cook & Root
ATT'YS

United States Patent Office 2,877,120
Patented Mar. 10, 1959

2,877,120

METHOD OF INTERLEAVING SHEETS OF MATERIAL BETWEEN SLICES OF FOOD AND APPARATUS THEREFOR

Robert G. Bush, Green Bay, Wis., assignor to U. S. Slicing Machine Company, Inc., La Porte, Ind., a corporation of Indiana Application December 24, 1956, Serial No. 630,253

21 Claims. (Cl. 99—171)

This invention relates to method and apparatus for interleaving sheets of material between slices of substance.

Specifically, the present invention deals with method and apparatus for interleaving sheets of paper between slices of food including the cutting of a sheet of paper of predetermined size from a continuous web. One edge of the cut sheet is held by gripping members and a fluid jet stream, such as a stream of air, is supplied to the under surface of the cut sheet to hold the sheet in relative horizontal position. The slice of food is applied to the top of the sheet, whereby the weight of the food slice will carry it and its underlying cut sheet downward onto a horizontal support or a conveyer. The interleaving machine is utilized in connection with a food or meat slicing machine, wherein the cutting of a sheet of paper of a predetermined size is correlated with the depositing of food slices on the paper in order to stack an interleaved package of food slices on a surface.

It is therefore an object of this invention to provide an improved method and apparatus for interleaving cut sheets of material with food slices.

Another object of this invention is in the provision of a method of intermittently feeding a web of material, cutting a predetermined length of the material to define a sheet, gripping the sheet from one edge thereof, and applying a blast of air to the underside of the sheet, whereby the sheets is held in relatively horizontal position.

Still another object of this invention resides in the provision of a method for interleaving food slices as they are received from a food slicing machine wherein a cut sheet of paper is suspended horizontally by a blast of air so that when a slice is applied thereto, the sheet and slice will be dropped onto a conveyor or other support.

A further object of this invention is to provide an improved interleaving machine which may be mounted for use in combination with a food slicer in order to interleave the food slices as they are delivered from the food slicer to a support.

A still further object of this invention is in the provision of an interleaving machine having novel means for coacting to cut a sheet of paper or other material and suspend the sheet from one edge thereof.

Another object of this invention is to provide apparatus for interleaving food slices which intermittently feeds a continuous web a predetermined distance, cuts the web to define a sheet of paper and holds it at one edge thereof, and suspends the cut sheet in a substantial horizontal position by applying a blast of air to the underside thereof.

Other objects, features, and advantages of the invention will be apparent from the following detailed disclosure, taken in conjunction with the accompanying sheets of drawings, wherein like reference numerals refer to like parts, in which:

Fig. 4 is a detailed sectional view, taken substantially along line 4—4 of Fig. 1, and with certain parts broken away and removed to show underlying parts;

Fig. 5 is a detailed transverse sectional view, taken substantially along line 5—5 of Fig. 1 and illustrating the means for preventing backlash and backward movement of the web;

Figure 1:
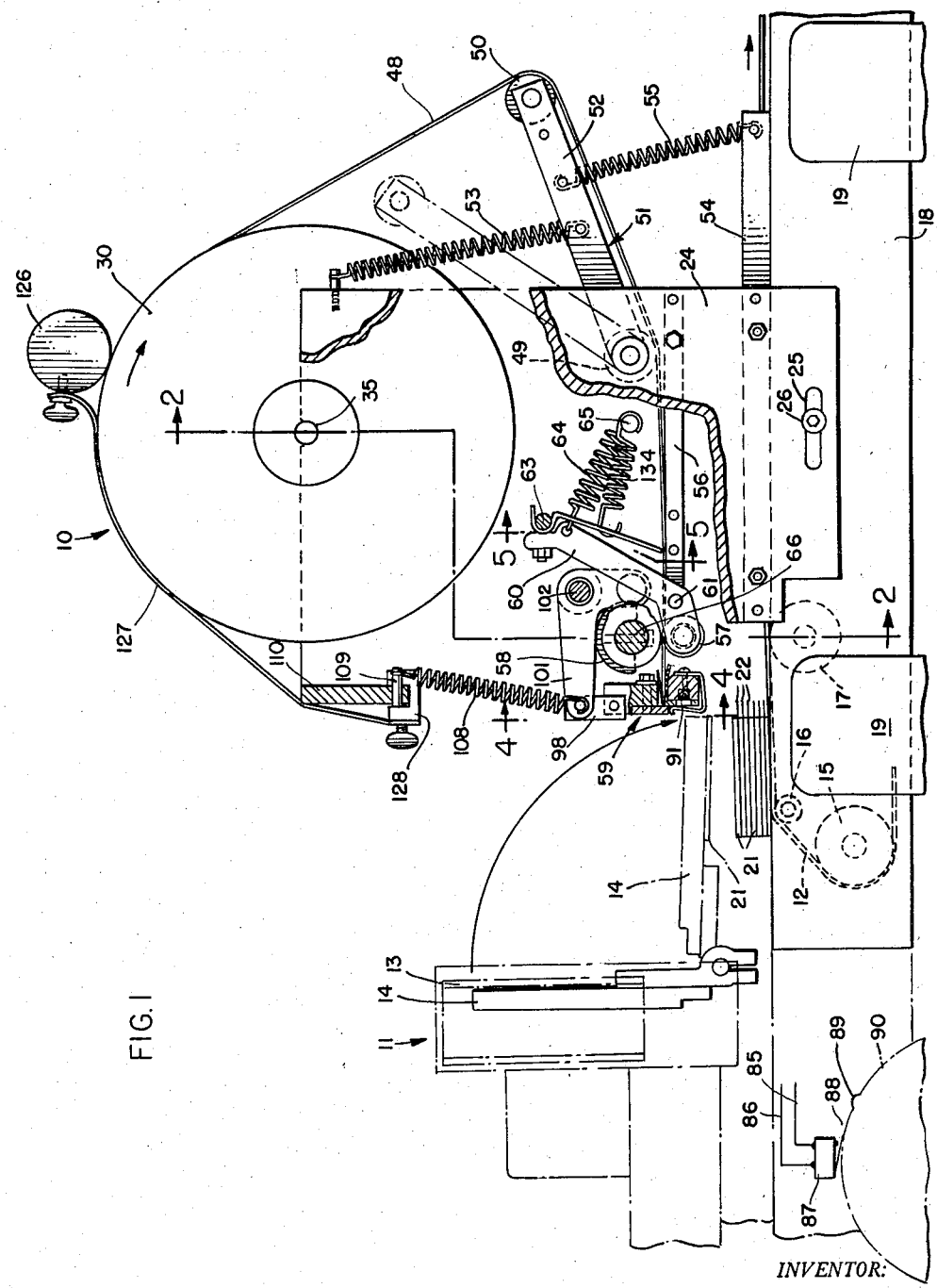
Fig. 1 is a side elevational view of the interleaving machine in accordance with the invention, with some parts broken away and other parts in section, and shown in combination with the discharge end of a food slicing machine.

Referring particularly to the drawings and Fig. 1, one embodiment of the invention is herein illustrated, wherein an interleaving machine in accordance with the invention is generally designated by the numeral 10 and shown in combination with a conventional food slicing machine 11. The food slices are delivered from the slicing machine 11 onto a support, such as a conveyor belt 12, and as the cut food slice is descending toward the conveyor, a sheet of paper or similar material is interleaved between each slice by the interleaving machine 10.

The type of slicing machine to which this invention is particularly adapted is illustrated in the Stiles Patent No. 1,231,959, the Meyer Reissue Patent No. 24,103, both of which are assigned to the assignee of record, the U. S. Slicing Machine Company, Inc. of La Porte, Indiana, and the Paul H. Meyer application Serial No. 459,899, filed October 4, 1954, and assigned to the assignee of the instant application. This slicing machine, in general, comprises an endless pronged receiver 13 adapted to receive each slice as it is severed and to convey it past a fly 14 having spaced fingers adapted to move between the prongs of the receiver and forcibly eject the slice from such prongs by movement back and forth and thereby to discharge the slices excessively on a receiving platform or as in this case the conveyor belt 12. The conveyor belt 12 is trained around a plurality of rollers 15, 16 and 17 supported between longitudinally extending and parallel spaced frame members 18. The frame members are mounted in elevated position by upwardly extending legs or standards 19. The conveyor may be a part of the slicing machine 11 or separate therefrom depending on the desires of the user. The upper ends of the frame members 18 are bent inwardly to a horizontal position as seen at 20, Fig. 2, to form supporting flanges for the conveyor belt 12. The fly 14 oscillates or reciprocates about a horizontal axis in order to transfer the food slices 21 from the endless receiver 13 to the conveyor belt 12, while the interleaving machine 10 operates to insert a cut sheet of paper or material 22 between each food slice. As shown in Fig. 1, the conveyor would be stationary between the stacking and interleaving operations, although it will be understood that interleaving could be accomplished during shingling of the food slices at which time the conveyor would be advancing step-by-step.

The interleaving machine includes a pair of upstanding parallel spaced side plates 23 and 24 which serve to support all of the components of the interleaving machine and are adapted to be mounted on the conveyer frame members 18. The side plate 24 extends downwardly and along side of the one frame member 18 and is provided with a longitudinally extending slot 25 which receives a nut and bolt assembly 26 for adjustably mounting the plates relative to the frame member 18. The side plate 23 is similarly adjustably mounted but spaced slightly outwardly of the other frame member 18 by an intermediate Z-shaped bar 27 which is slotted at one end to receive a nut and bolt assembly 28 for adjustably mounting the bar to the other frame member 18. The other end of the Z-shaped bar is secured to the lower end of the side plate 23 by any suitable means such as a fastener 29. It will be understood that the conveyer might be wider in some instances than the side plate 23, and then the side plate 23 would be connected directly to the other frame member 18 as on the opposite side.

A supply of divider material, such as a roll of paper 30 is supported between the side plates 23 and 24 on a mounting core assembly 31. This core assembly includes an elongated shaft 32 supported in saddle bearings 33 formed on the upper edge of the side plates. This arrangement facilitates removal of the entire core assembly and roll of paper for dismantling the roll of paper to replace it with a roll of paper of different width or to mount a new roll of paper on the core assembly. The shaft 32 is threaded except for the opposite reduced end portions 34 and 35.

Figure 2:
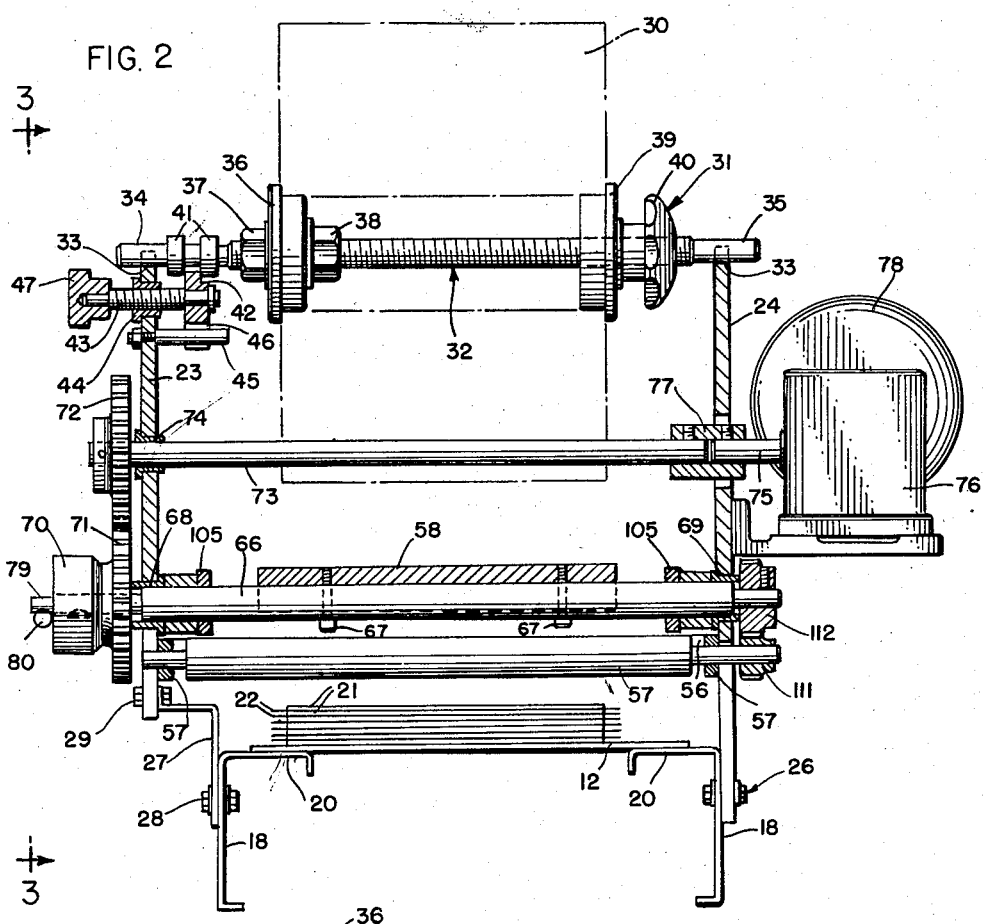
Fig. 2 is a transverse sectional view, taken substantially along line 2—2 of Fig. 1 and looking in the direction of the arrows.

In mounting a roll of paper on the core assembly, a flanged core end 36 is adjustably positioned on the threaded portion of the shaft by locking nuts 37 and 38 on opposite sides thereof, as seen in Fig. 2. The roll of paper is then arranged over the shaft so that one side abuts against the flanged core end 36. Then a second flanged core end 39 is slidably received over the end of the shaft adjacent the reduced portion 35 and arranged with respect to the roll of paper. This core end 39 is held in place then by a nut 40 which may be manually tightened on the end of the shaft. The roll of paper and core assembly is then suspended between the side plates in the saddle bearings 33.

In order to further properly align the roll of paper with respect to the side plates 23 and 24, a pair of axially spaced collars 41 on the reduced end portion 34 is provided to coact with an adjusting lug 42. The adjusting lug 42 is rotatably mounted on the end of a screw 43 which is threadedly received in a boss 44 mounted in the side plate 23. The lug 42 engaging between the collars 41 is held against rotation during adjusting of the screw 43 by a pin 45 extending from the side plate 23 and slidably received in a groove 46 formed in the lug. A knob 47 is provided on the outer end of the screw 43 to facilitate manual adjustment of the screw 43 and orientation of the roll of paper between the side plates.

A continuous web of paper 48 is taken from the roll 30 and trained over rollers 49 and 50 of a take-up assembly 51. These rollers, Fig. 1, are mounted on parallel axes at opposite ends of a pair of transversely spaced arms 52. The roller shaft of roller 49 is additionally journalled at its opposite ends in the side plates 23 and 24 so that the arms 52 may swing around this pivot. Each arm 52 is resiliently connected to an adjacent side plate by a spring 53 and to a rearwardly extending bar 54 by a spring 55 in order to resiliently support the take-up assembly.

From the roller 49 of the take-up assembly, the web 48 travels across a fixed table 56 which is mounted between the side plates 23 and 24.

At the forward end of the table 56, a feed roller 57 coacts with a segmental feed roller 58 for feeding the paper to a cutter 59. The roller 57 is rotatably carried by a pair of spaced arms 60, Figs. 1, 6, and 7, which are pivotally mounted to pins 61 on the forward end of the table 56. An adjustable stop 62 is carried at the other end of the arms for engaging a transversely extending bar 63 fixed to the opposing side plates 23 and 24. The stop 62 is resiliently urged against the bar 63 by the spring 64 which is connected at one end to the arm 60 and at the other end to a transversely extending fixed bar 65. Hence, if the pressure exerted by the segmental feed roller 58 exceeds the force exerted by the spring 64, the roller 57 may pivot about the pins 61.

The segmental feed roller 58 is half moon in shape and secured to a transversely extending shaft 66 by bolts 67. Feeding of the paper to the cutter 59 takes place only during the time the outer peripheral surface of the segmental feed roller 58 contacts the paper and coacts with the lower back up roller 57 so that feeding would begin when the leading edge of the segmental feed roller 58 commences to coact with the back up roller 57 and feeding would end when the trailing edge of the roller 58 would discontinue coacting with the feed roller 57. The shaft 66 is rotatably mounted in bushings or bearings 68 and 69 carried in the side plates 23 and 24 respectively. The web 48 is intermittently fed to the cutter 59 by the application of intermittent driving force to the power shaft 66.

Intermittent driving of the shaft 66 is effected by a one revolution clutch 70 of the conventional type. This clutch carries a gear 71 which is continually rotated and in meshing engagement with an upper gear 72. The upper gear 72 is mounted on the end of a drive shaft 73 which is bearingly mounted in the side plate 23 by a bearing 74. The other end of the drift shaft 73 is connected to a stub drive shaft 75 of a reducer 76 by a coupling 77. The reducer 76 is, in turn, driven by a prime mover such as an electric motor 78.

Figure 3:
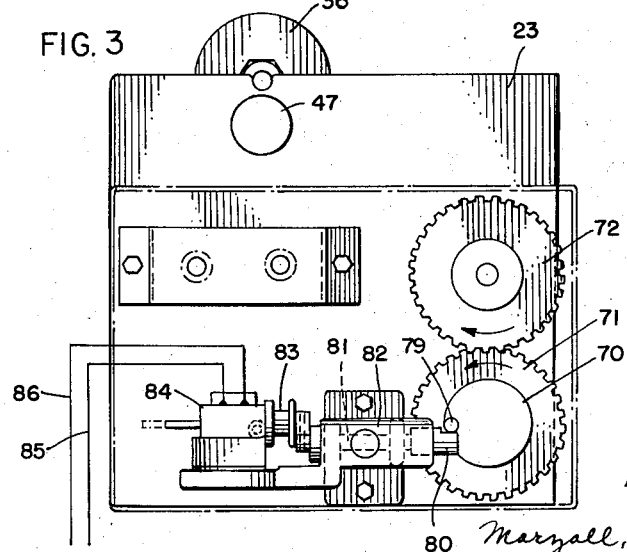
Fig. 3 is a side elevational view, taken substantially along line 3—3 of Fig. 2.

A pin 79 extends laterally from the one revolution clutch 70 and is normally engaged by a movable detent 80. During engagement of the pin 79 by the detent 80, no driving force is transmitted from the gear 71 to the power shaft 66, and consequently, the shaft 66 is stationary. The detent 80 is mounted on the end of a rod 81 slidably received in a housing 82. The other end of the rod 82 is connected to an armature 83 to a solenoid 84 having lead wires 85 and 86 connected to a micro switch 87 of the timing mechanism which correlates the slicing machine with the interleaving machine. The micro switch 87 is normally open and provided with an actuating arm 88 which is periodically engaged by a cam 89 mounted on the main crown gear 90 of the slicing machine 11. Thus, upon actuation of the arm 88 by the cam 89, the micro switch 87 closes in order to energize the solenoid 84 and retract the detent 80 from the path of the pin 79 on the one revolution clutch 70. When the pin 79 is allowed to rotate with the gear 71, power is then transmitted from the gear 71 to the power shaft 66 and feeding of the paper web by the segmental feed roller 58 is commenced. This timing mechanism is seen most clearly in Figs. 1 and 3. As seen in Fig. 3, the detent housing and supporting member 82 and the solenoid may be mounted laterally of the side plate 23.

The cutter 59 includes a lower cutter bar 91, Figs. 1, 4, 6, and 7, having an upper cutting edge 92, and an upper cutter bar 93 having a lower cutting edge 94 coacting with the upper cutting edge 92 of the lower cutter bar 91. The lower cutter bar 91 extends across the machine and is fixed to an elongated block which, in turn, is connected to the opposite side plates 23 and 24. The upper cutter bar, which reciprocates to effect the cutting of the web, is bolted to a cross bar 96. Pins 97 extend from the opposite ends of the cross bar 96 and are pivotally connected to links 98 at each end of the cross bar. The upper movable cutter bar 93 is provided at each end thereof with a vertical slot 99 for engaging a stud or pin 100 thereby limiting the lateral movement of the movable cutter bar 93 with respect to the fixed cutter bar 91. Means (not shown) such as a nut would obviously be provided at the outer end of the studs 100 in order to confine the path of movement of the movable cutter bar 93 and assure that the upper cutting edge 92 always coacts or meshes properly with the lower cutting edge 94.

Figure 6:
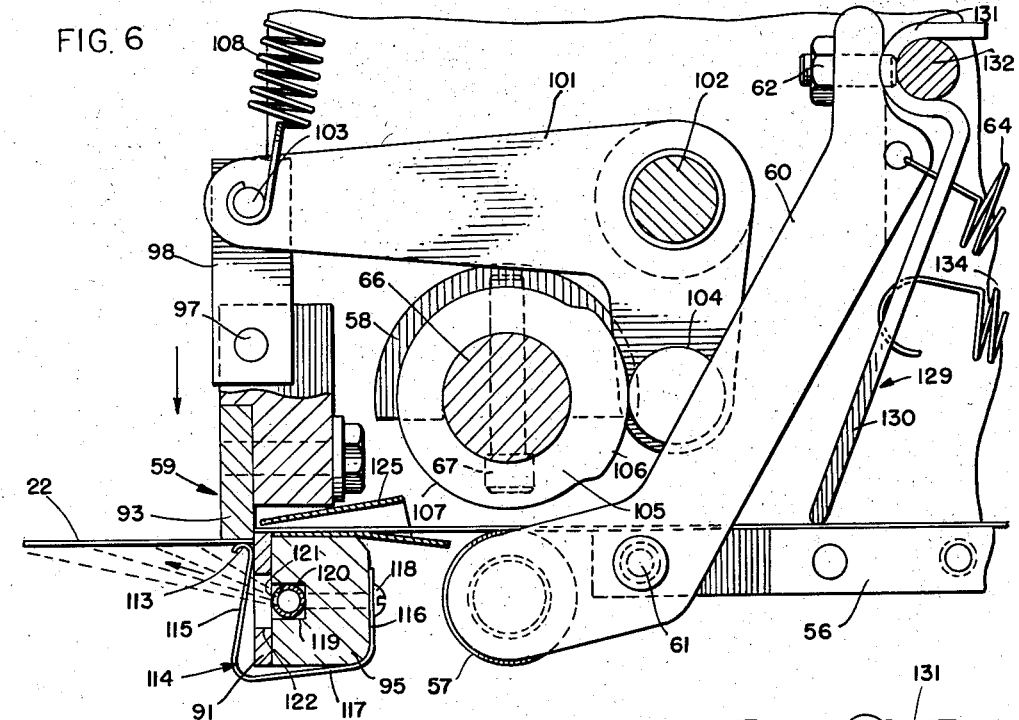
Fig. 6 is an enlarged fragmentary longitudinal sectional view, with certain parts removed for clarity, and illustrating the position of the parts after the web has been cut, wherein the cut sheet is held at one edge and suspended horizontally by the blast of air on the underside thereof.
Figure 7:
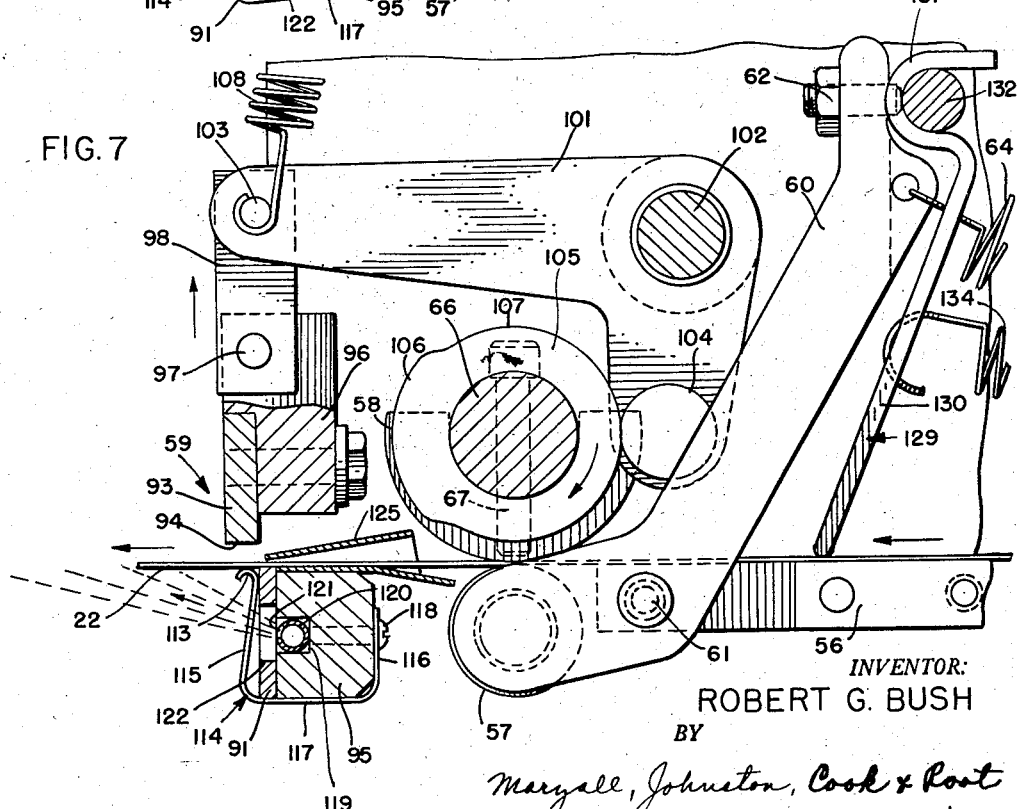
Fig. 7 is a view similar to Fig. 6 but illustrating the paper feed position.

Reciprocation of the movable cutter bar 93 is effected through a bell crank and a cam arrangement which includes a pair of bell cranks 101 pivotally carried on a fixed cross shaft 102 extending between the side plates 23 and 24. At the end of one arm of each bell crank, a pin 103 is pivotally connected with the link 98 extending from the cross bar 96. The other arm of each bell crank carries a cam follower 104 which engages an actuating cam 105 on the power shaft 66, Figs. 1, 2, 4, 6, and 7. Each cam is formed to include a high section 106 of small arcuate extent and a low section 107 of great arcuate extent. The cam follower 104 is biased into engagement with the cam 105 by a spring 108 secured to the bell crank pin 103 at one end and to a lug 109 at the other end, the lug being mounted on a transversely extending vertical plate 110 connected at opposite ends to the side plates 23 and 24. The cam 105, being keyed to the power shaft 66 and therefore rotatable with the segmental feed roller 58 is timed to effect a cutting operation after the web has been advanced a predetermined distance. As seen in Fig. 7, the cam follower 104 is riding on the low section of the cam 105 and therefore holds the upper movable cutter bar 93 above the upper cutting edge 92 of the lower cutter bar 91. During the time the cam follower rides on the low section 107 of the cam 105, the paper web is advanced by the coacting feed rollers 57 and 58. It will be seen in Fig. 2 that the shaft mounting the coacting feed rollers 57 and 58 are provided at one end with meshing gears 111 and 112 whereby the power shaft 66 delivers power to the shaft of the lower roller 57. The gears 111 and 112 are specially built to allow slight separation therebetween without unmeshing thereof. When the low sections of the cams meets the high sections, downward stroking of the upper cutter bar 93 will be effected, and the position of the parts after the web has been cut is illustrated in Fig. 6.

As the upper cutter bar moves downwardly and coacts with the lower cutter bar to cut a predetermined length of paper from the web and define a cut sheet 22, the substantially horizontal face defining the upper cutting edge 94 coacts with the upper curled end 113 of a spring clip or finger 114. Actually, a plurality of these spring clips are transversely spaced along the fixed lower cutter bar, Fig. 4. Each spring clip is generally U-shaped and includes substantially vertically extending legs 115, 116, and a connecting bar 117 therebetween. The rear leg 116 intimately engages the back side of the elongated supporting bar 95 and is secured thereto by a screw 118 or other suitable means. During the paper feed position of the machine, Fig. 7, the connecting bar 117 lays intimate with the bottom side of the supporting bar 95. The front leg 115 is arranged to force the curled end 113 against the front face of the lower cutter bar 91 by the initial shape of the spring clip before mounting on the cutting bar and supporting bar, at which time the normal position of the curled end 113 would be spaced closer to the rear leg 116 than the combined thickness of the supporting block 95 and the cutter bar 91. The connecting bar 117 is also sized to space the lower end of the front leg 115 from the front face of the lower cutting bar. Downward movement of the upper cutter bar 93 impinges the corresponding ends of the cut sheet 22 with the spring clips 114 and further downward movement of the cutter bar displaces the curled end 113 of the spring clip downwardly as seen in Fig. 6. Accordingly, the edge of the cut sheet 22 is held under spring pressure generated by the spring clip 114. The other end of the cut sheet 22 extends away from the cutter and is held in generally horizontal position by applying a blast of air or a fluid jet stream to the under side thereof.

In order to apply a blast of air or a fluid jet stream to the under side of the cut sheet 22, a longitudinal groove 119 is formed in the front face of the supporting block 95 to receive therein an air tube 120. The air tube 120 is provided with spaced apertures 121, the axis of which extends in the direction of the under side of the cut sheet 22 and allows air to be applied thereto through an elongated slot or air hole 122 formed in the lower fixed cutter bar 91, Figs. 4, 6, and 7. Air may be supplied to the air tube by any suitable means such as pump means through the inlet 123 which is connected to the air tube 120 by a valve 124. On-off control of the air may be effected by manipulation of the valve 124. Preferably, a continuous blast of air is supplied to the air tube, although it will be understood that the air blast need only be supplied during the time that the cut sheet is impinged by the upper cutter bar and the spring clips. In other words, the supply of air does not function to support the sheet when the machine is in the paper feed position.

In order to assure proper feeding of the paper web to the cutter, a scoop or guide 125 is provided between the cutter and the feed roller. This scoop includes upper and lower plates having a relatively wide mouth or inlet for receiving the paper web and a relatively small outlet just ahead of the cutter bars.

Referring again to Fig. 1, in order to prevent the roll of paper 30 from over running, a weight 126 is floatingly supported on the top of the paper roll and held in position by a flexible strap or belt 127 connected at one end to the weight 126 and at the other end to a clamp 128 on the vertical plate 110. As the paper roll decreases in diameter, the weight moves downwardly under its own gravitational force. It is important that the weight be arranged slightly beyond the center of rotation of the paper roll and in the direction of rotation thereof, as clearly seen in Fig. 1.

In order to obtain accurate feeding of the paper web to the cutter so that each cut sheet is of substantially the same size, it is important that the paper web does not move away from the cutter after the cutting operation has been effected and the segmental feed roller 58 has moved to a position out of contact of the lower feed roller 57. To accomplish this end, one or more retarder plates 129, Figs. 1, 5, 6, and 7, are arranged to coact with the table 56 in such a manner as to prevent backlash or reverse movement of the paper web during the cut position of the machine as seen in Fig. 6. Each plate includes a relatively wide lower flat portion 130 and a hook portion 131 at the upper end thereof. The upper hook portion 131 is pivotally received around a transversely arranged support bar 132, and may be adjustably held in place therealong by axially spaced adjustable collars 133, Fig. 5. As seen most clearly in Figs. 6 and 7, the length of the lower flat portion 130 is greater than the distance between the transverse bar 132 and the table 56 so that as arranged in Figs. 6 and 7, the retarder 129 can not swing counterclockwise about the bar 132 beyond the table 56. The lower contacting end of the flat portion 130 is rounded in order to provide smooth contact with the paper web, and this end is continually held in contact with the paper web under resilient pressure by a spring 134 connected at one end to the retarder and at the other end to the transverse bar 65, Fig. 1. Accordingly, as the coacting feed rollers advance the paper web toward the cutter, the resilient pressure of the spring 134 is overcome in order to permit the paper web to pass between the retarder 129 and the table 56, but reverse movement of the paper web is prevented due to the biting action taken by the retarder and the table which is enhanced by the attempted rearward movement of the paper web.

While the overall operation of the machine has already been clearly set forth, a brief and concise operation will be given in order to assure a clear understanding of the invention. When the cam 89 on the main crown gear 90 of the slicing machine 11 actuates the arm 88 of the micro switch 87, the circuit to the solenoid 84 is closed and the solenoid is energized in order to retract the movable detent 80 from the path of the pin 79 on the one revolution clutch 70. Up to this time, position of the parts in the interleaving machine 10 are shown in Fig. 6 with the cut sheet 22 already being on the conveyor with a slice received from the slicing machine and the fly 14 having been retracted at least past the cutter 59. As the one revolution clutch 70 applies power to the power shaft 66, the coacting feed rollers 57 and 58 come into operation in order to advance the paper web to the cutter. Before the feed rollers begin their advancing or feeding action, the upper cutter bar 93 will have moved to its upper position, Fig. 6, by action of the cam 105 and the bell crank 101. Subsequent to the feeding operation by the feed rollers, the high side 106 of the cam 105, or rather the lift on the cam between the low side and the high side actuates the bell crank 101 in order to bring down the upper cutter bar 93 and effect a cutting operation in coaction with the lower cutter bar 91. Substantially, simultaneously, the cutter bar coacts with the resilient clips or fingers 114 in order to impinge the one edge of the cut paper sheet 22 therebetween, Fig. 6. The air blast supplied from the air tube 120 functions to apply pressure to the underside of the cut sheet 22 and maintain this sheet in substantially horizontal position in order to receive the next slice from the slicing machine. The slice is then applied to the upper side of the cut sheet 22, and with its weight and frictional contact carries the sheet 22 downwardly and at the same time pulling it from the grasp of the resilient fingers or clips 114 and the upper cutter bar 93 and stacks the same on the conveyor 12. It is obvious that the fly 14 when it stops at its downward stroke, effectively throws the slice 21 and the paper sheet 22 therefrom. After the slice and cut sheet have left the fly 14, the fly will then retract behind the endless pronged receiver 13 in order to wait for the next slice.

It will be understood that modifications and variations may be effected without departing from the scope of the novel concepts of the present invention, but it is understood that this application is to be limited only by the scope of the appended claims.

The invention is hereby claimed as follows:

1. The method of interleaving sheets of material between slices of food as the food is being sliced, comprising feeding a predetermined length of material from a continuous web, cutting the length from the web, holding one edge of the cut length of material, and applying a fluid jet stream to the underside of said cut length of material to suspend the material from one end and in a substantially horizontal position.

2. The method of interleaving sheets of material between slices of food as the food is being sliced, comprising feeding a predetermined length of material from a continuous web, cutting the length from the web, holding the cut edge of the cut length of material, and applying a pneumatic blast to the underside of said cut length to support same in a substantially horizontal plane.

3. The method of interleaving sheets of paper between slices of food comprising, cutting a sheet of paper of predetermined size from a continuous web, holding one edge of the cut sheet, applying a stream of air to the underside of said cut sheet to hold the sheet in relative horizontal position, and applying a slice of food on top of said cut sheet, whereby the weight of the slice of food will carry it and its underlying cut sheet onto a support spaced therebelow.

4. A method of producing a bundle of slabs of food with sheets of divider material between the slabs, said method including cutting a sheet of divider material from a continuous web, impinging one edge of the sheet, applying an air blast to the underside of said sheet to suspend the sheet in substantially horizontal positions, and applying a slab to the top of the sheet.

5. A method of producing a bundle of slabs of food with sheets of divider material between the slabs, said method including successively cutting sheets of divider material from a continuous web, successively impinging one edge of each sheet, applying an air blast to the underside of each sheet to suspend the sheet in a substantially horizontal position, and successively applying a slab to the upper side of each sheet.

6. A method of producing a bundle of slabs of food with sheets of divider material between the slabs, said method including successively cutting sheets of divider material from a continuous web, successively impinging one edge of each sheet, applying an air blast to the underside of each sheet to suspend the sheet in a substantially horizontal position, successively applying a slab to the upperside of each sheet, and depositing said slab and sheet on a support therebelow.

7. Apparatus for interleaving sheets of material between slices of food which comprises a support extending substantially horizontally, means for intermittently feeding a continuous web of material over said support, means for severing a portion of said material from the web, and means applying a fluid jet stream to the underside of said severed portion for suspending substantially horizontally said severed portion.

8. Apparatus for interleaving sheets of material between slices of food which comprises a support extending substantially horizontally, means for intermittently feeding a continuous web of material over said support, means for severing a portion of said material from the web, and means for holding said severed portion at the very severed end thereof, and means applying a fluid jet stream to the underside of said severed portion for suspending substantially horizontally said severed portion.

9. Apparatus for interleaving sheets of material between slices of food which comprises a support extending substantially horizontally, means for intermittently feeding a continuous web of material over said support, means for severing a portion of said material from the web, and means for holding said severed portion at the very severed end thereof and suspending substantially horizontally said severed portion, said means including pneumatic means for applying a blast of air to the underside of said suspended severed portion.

10. An interleaving machine adapted to be mounted on a food slicing machine for interleaving sheets of material between the food slices as they are discharged from the slicing machine, said interleaving machine comprising, a freely rotatable support carrying a rolled-up continuous web, means for intermittently feeding said web over a horizontal surface, means for cutting the web to form successive sheets of material, holding means gripping one end of a sheet, and pneumatic means for applying a blast of air to the underside of the sheet thereby suspending the sheet in substantially horizontal position.

11. An interleaving machine adapted to be mounted on a food slicing machine for interleaving sheets of material between the food slices as they are discharged from the slicing machine, said interleaving machine comprising, means for rotatably supporting a rolled web of material, means for cutting the material into sheets of predetermined length, and means for applying a blast of air to the underside of each sheet thereby suspending each sheet in cantilever fashion, whereby a slice of food may be applied to said sheet from above by the slicing machine and the slice and sheet dropped to a support therebelow.

12. An interleaving machine adapted to be mounted on a food slicing machine for interleaving sheets of material between the food slices as they are discharged from the slicing machine, said interleaving machine comprising, means for rotatably supporting a rolled web of material, means for cutting the material into sheets of predetermined length, means for intermittently advancing the web to said cutting means, and means for applying a blast of air to the underside of each sheet thereby suspending each sheet in cantilever fashion, whereby a slice of food may be applied to said sheet from above by the slicing machine and the slice and sheet dropped to a support therebelow.

13. An interleaving machine adapted to be mounted on a food slicing machine for interleaving sheets of material between the food slices as they are discharged from the slicing machine, said interleaving machine comprising, means for rotatably supporting a rolled web of material, means for cutting the material into sheets of predetermined length, means for intermittently advancing the web to said cutting means, means for retarding movement of said web away from said cutting means, and means for applying a blast of air to the underside of each sheet thereby suspending each sheet in cantilever fashion, whereby a slice of food may be applied to said sheet from above by the slicing machine and the slice and sheet dropped to a support therebelow.

14. An interleaving machine for use with a slicing machine wherein the slicing machine delivers successive slices along an arcuate path to a point adjacent said interleaving machine and is correlated to operate in timed relation therewith, said interleaving machine comprising, rotatable means for supporting a rolled web of material, means for applying a blast of air to the underside of each sheet thereby cantileverly suspending cut sheets of material in a substantially horizontal position, feed means for advancing said web intermittently to the cutter at predetermined intervals, means for guiding said web to the feed means, and means for preventing movement of said web away from said cutter.

15. An interleaving machine for use with a slicing machine wherein the slicing machine delivers successive slices to a point adjacent said interleaving machine and is correlated to operate in timed relation therewith, said interleaving machine comprising, rotatable means for supporting a roll of divider material whereby a continuous web may be taken therefrom, a cutter for successively cutting sheets of predetermined length from said web, means coacting with said cutter for successively impinging one edge of each cut sheet, and means for directing a fluid jet stream to the underside of each cut sheet to support the sheet in a substantially horizontal position.

16. An interleaving machine for use with a slicing machine wherein the slicing machine delivers successive slices to a point adjacent said interleaving machine and is correlated to operate in timed relation therewith, said interleaving machine comprising, rotatable means for supporting a roll of divider material whereby a continuous web may be taken therefrom, a cutter for successively cutting sheets of predetermined length from said web, means coacting with said cutter for successively impinging one edge of each cut sheet, means for directing a fluid jet stream to the underside of each cut sheet to support the sheet in a substantially horizontal position, and means for intermittently feeding the web to the cutter at predetermined intervals.

17. An interleaving machine for use with a slicing machine wherein the slicing machine delivers successive slices to a point adjacent said interleaving machine and is correlated to operate in timed relation therewith, said interleaving machine comprising, rotatable means for supporting a roll of divider material whereby a continuous web may be taken therefrom, means for sequentially cutting sheets of predetermined length from said web, and means for applying a blast of air to the underside of each sheet thereby successively cantileverly supporting each sheet in a substantially horizontal position, whereby a slice may be applied to one side of each sheet by the slicing machine and the slice and sheet transferred to a support.

18. An interleaving machine for use with a slicing machine wherein the slicing machine delivers successive slices to a point adjacent said interleaving machine and is correlated to operate in timed relation therewith, said interleaving machine comprising, rotatable means for supporting a roll of divider material whereby a continuous web may be taken therefrom, a cutter for successively cutting sheets of predetermined length from said web, said cutter including an upper movable cutter bar and a lower fixed cutter bar coacting therewith, said upper cutter bar having a cutting edge and a substantially horizontal impinging member contiguous therewith, a lower impinging member on said lower cutter bar coacting with said horizontal impinging member to successively impinge one edge of each sheet, and pneumatic means for applying a blast of air to the underside of each sheet and suspend same in a substantially horizontal direction, whereby a slice may be applied to the upper side of each sheet by the slicing machine and the slice and sheet transferred to a support therebelow.

19. An interleaving machine for use with a slicing machine wherein the slicing machine delivers successive slices to a point adjacent said interleaving machine and is correlated to operate in timed relation therewith, said interleaving machine comprising, rotatable means for supporting a roll of divider material whereby a continuous web may be taken therefrom a cutter for successively cutting sheets of predetermined length from said web, said cutter including an upper movable cutter bar and lower fixed cutter bar coacting therewith, said upper cutter bar having a cutting edge and a substantially horizontal impinging member contiguous therewith, a lower impinging member on said lower cutter bar coacting with said horizontal impinging member to successively impinge one edge of each sheet, pneumatic means for applying a blast of air to the underside of each sheet and suspend same in a substantially horizontal direction, and means for sequentially feeding predetermined lengths of said web to said cutter, said feeding means including coacting feed rollers operated in timed relation with said cutter, whereby a slice may be applied to the upper side of each sheet by the slicing machine and the slice and sheet transferred to a support therebelow.

20. An interleaving machine for use with a slicing machine wherein the slicing machine delivers successive slices to a point adjacent said interleaving machine and is correlated to operate in timed relation therewith, said interleaving machine comprising, rotatable means for supporting a roll of divider material whereby a continuous web may be taken therefrom, a cutter for successively cutting sheets of predetermined length from said web, said cutter including an upper movable cutter bar and a lower fixed cutter bar coacting therewith, said upper cutter bar having a cutting edge and a substantially horizontal impinging member contiguous therewith, a lower impinging member on said lower cutter bar coacting with said horizontal impinging member to successively impinge one edge of each sheet, pneumatic means for applying a blast of air to the underside of each sheet and suspend same in a substantially horizontal direction, and means for sequentially feeding predetemined lengths of said web to said cutter, said feeding means including coacting feed rollers operated in timed relation with said cutter, one of said rollers having a continuous surface and said other roller having a discontinuous surface, whereby a slice may be applied to the upper side of each sheet by the slicing machine and the slice and sheet transferred to a support therebelow.

21. An interleaving machine for use with a slicing machine wherein the slicing machine delivers successive slices to a point adjacent said interleaving machine and is correlated to operate in timed relation therewith, said interleaving machine, comprising rotatable means for supporting a roll of divider material whereby a continuous web may be taken therefrom, a cutter for successively cutting sheets of predetermined length from said web, said cutter including an upper movable cutter bar and a lower fixed cutter bar coacting therewith, said upper cutter bar having a cutting edge and a substantially horizontal impinging member contiguous therewith, a lower impinging member on said lower cutter bar coacting with said horizontal impinging member to successively impinge one edge of each sheet, pneumatic means for applying a blast of air to the underside of each sheet and suspend same in a substantially horizontal direction, and means for sequentially feeding predetermined lengths of said web to said cutter, said feeding means including coacting feed rollers operated in timed relation with said cutter, one of said rollers having a segmental circumferential surface and said other roller having a continuous circumferential surface, whereby a slice may be applied to the upper side of each sheet by the slicing machine and the slice and sheet transferred to a support therebelow.

References Cited in the file of this patent

UNITED STATES PATENTS

| | | |
|---|---|---|
| 1,811,772 | Willoughby | June 23, 1931 |
| 1,904,741 | Lorber | Apr. 18, 1933 |
| 2,023,122 | Chandler | Dec. 5, 1935 |
| 2,116,845 | Peck | May 10, 1938 |
| 2,781,272 | Rudwick et al. | Feb. 12, 1957 |
| 2,813,798 | Toby | Nov. 19, 1957 |